United States Patent
Goel et al.

(10) Patent No.: US 7,688,458 B2
(45) Date of Patent: Mar. 30, 2010

(54) METHODS AND APPARATUS FOR PRINT WORKFLOW PROCESSING

(75) Inventors: Puneet Goel, Union City, CA (US);
Shailesh Kunnath Venugopal, Fremont, CA (US); Jaekil Lee, Union City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1092 days.

(21) Appl. No.: 10/840,569

(22) Filed: May 5, 2004

(65) Prior Publication Data

US 2005/0248804 A1    Nov. 10, 2005

(51) Int. Cl.
*G06F 3/12*    (2006.01)
*G06K 1/00*    (2006.01)
(52) U.S. Cl. .................. 358/1.13; 358/1.1; 358/1.9
(58) Field of Classification Search .............. 358/1.1, 358/1.9, 1.11–1.18, 402, 1.8; 709/227, 233; 718/100, 102
See application file for complete search history.

(56) References Cited

U.S. PATENT DOCUMENTS

| | | |
|---|---|---|
| 6,594,028 B1 | 7/2003 | Hamamoto et al. |
| 7,412,520 B2 * | 8/2008 | Sun .......................... 709/227 |
| 2001/0043365 A1 | 11/2001 | Kremer et al. |
| 2002/0097429 A1 | 7/2002 | Ferlitsch |
| 2003/0103232 A1 * | 6/2003 | Twede ....................... 358/1.15 |
| 2004/0111430 A1 * | 6/2004 | Hertling et al. .......... 707/104.1 |
| 2005/0028073 A1 * | 2/2005 | Henry et al. ................ 715/500 |
| 2005/0050466 A1 * | 3/2005 | Sangroniz et al. ........... 715/526 |

FOREIGN PATENT DOCUMENTS

| | | |
|---|---|---|
| EP | 1220085 A2 | 7/2002 |
| EP | 1465055 A2 | 10/2004 |
| WO | PCT/US2005/015314 | 6/2006 |

* cited by examiner

*Primary Examiner*—Thierry L Pham
(74) *Attorney, Agent, or Firm*—Michael A. Glenn; Glenn Patent Group

(57) ABSTRACT

Methods and apparatus are provided for processing a print job through a copy of a workflow, modifying the copied workflow and reprocessing the print job only through the modified portion of the copied workflow. In addition, methods and apparatus in accordance with this invention are provided for modifying or inserting additional print files into a print job that has already been processed through a workflow, and processing only the modified or inserted print files through the workflow.

7 Claims, 11 Drawing Sheets

| | 60 | 50 |
|---|---|---|
| 52 | Process Node 1 | Stage 1 |
| | Input: | Input File 1.pdf — 54 |
| | Output: | — 56 |
| | Status: | Not Completed — 58 |
| 52 | Process Node 2 | Stage 2 |
| | Input: | |
| | Output: | |
| | Status: | Not Completed |
| | Process Node 3 | Stage 3 |
| | Input: | — 54 |
| | Output: | — 56 |
| | Status: | Not Completed — 58 |
| | ⋮ | |
| 52 | Process Node N | Stage N |
| | Input: | |
| | Output: | |
| | Status: | Not Completed |

FIG. 3

PIF1 60 50

| Process Node 1 | Input Folder |
|---|---|
| Input: | Brochure 1.pdf |
| Output: | |
| Status: | Processing |
| Process Node 2 | Spot Color Manage |
| Input: | |
| Output: | |
| Status: | Not Completed |
| Process Node 3 | Preflight |
| Input: | |
| Output: | |
| Status: | Not Completed |
| Process Node 4 | Impose |
| Input: | |
| Output: | |
| Status: | Not Completed |
| Process Node 5 | Output Folder |
| Input: | |
| Output: | |
| Status: | Not Completed |

FIG. 4B

60 — PIF1   50

| Process Node 1 | Input Folder |
|---|---|
| Input: | Brochure 1.pdf |
| Output: | Brochure 1O1.pdf |
| Status: | Completed |
| Process Node 2 | Spot Color Manage |
| Input: | Brochure 1O1.pdf |
| Output: | |
| Status: | Not Completed |
| Process Node 3 | Preflight |
| Input: | |
| Output: | |
| Status: | Not Completed |
| Process Node 4 | Impose |
| Input: | |
| Output: | |
| Status: | Not Completed |
| Process Node 5 | Output Folder |
| Input: | |
| Output: | |
| Status: | Not Completed |

FIG. 4C

| PIF1 60 | 50 |
|---|---|
| Process Node 1 | Input Folder |
| Input: | Brochure 1.pdf |
| Output: | |
| Status: | Failed |
| Process Node 2 | Spot Color Manage |
| Input: | |
| Output: | |
| Status: | Not Completed |
| Process Node 3 | Preflight |
| Input: | |
| Output: | |
| Status: | Not Completed |
| Process Node 4 | Impose |
| Input: | |
| Output: | |
| Status: | Not Completed |
| Process Node 5 | Output Folder |
| Input: | |
| Output: | |
| Status: | Not Completed |

FIG. 4D

60 PIF1  50

| Process Node 1 | Input Folder |
|---|---|
| Input: | Brochure 1.pdf |
| Output: | Brochure 1O1.pdf |
| Status: | Completed |
| Process Node 2 | Spot Color Manage |
| Input: | Brochure 1O1.pdf |
| Output: | Brochure 1O2.pdf |
| Status: | Completed |
| Process Node 3 | Preflight |
| Input: | Brochure 1O2.pdf |
| Output: | Brochure 1O3.pdf |
| Status: | Completed |
| Process Node 4 | Impose |
| Input: | Brochure 1O3.pdf |
| Output: | Brochure 1O4.pdf |
| Status: | Completed |
| Process Node 5 | Output Folder |
| Input: | Brochure 1O4.pdf |
| Output: | Brochure 1O5.pdf |
| Status: | Completed |

FIG. 6

| | | | | |
|---|---|---|---|---|
| Process Node 1 | | Process Node 1 | |
| Input: | Brochure 1.pdf | Input: | Brochure 2.pdf |
| Output: | Brochure 101.pdf | Output: | |
| Status: | Completed | Status: | Not Completed |
| Process Node 2 | | Process Node 2 | |
| Input: | Brochure 101.pdf | Input: | |
| Output: | Brochure 102.pdf | Output: | |
| Status: | Completed | Status: | Not Completed |
| Process Node 3 | | Process Node 3 | |
| Input: | Brochure 102.pdf | Input: | |
| Output: | Brochure 103.pdf | Output: | |
| Status: | Completed | Status: | Not Completed |
| ⋮ | ⋮ | ⋮ | ⋮ |
| Process Node 5 | | Process Node 5 | |
| Input: | Brochure 104.pdf | Input: | |
| Output: | Brochure 105.pdf | Output: | |
| Status: | Completed | Status: | Not Completed |

FIG. 8

METHODS AND APPARATUS FOR PRINT WORKFLOW PROCESSING

BACKGROUND

This invention relates to print processing systems. More particularly, this invention relates to methods and apparatus for print workflow processing.

Digital print devices, such as color and black and white digital printers and copiers, have become increasingly popular in recent years. Indeed, while the cost of digital print devices has dropped significantly, the number of hardware devices and software applications that are capable of producing digital output that may be printed on such devices has substantially increased. Further, as the output quality and resolution of digital print devices has improved, the number of uses for such devices also has increased.

In a conventional digital image processing system, a digital image source, such as a digital camera, scanner, computer memory, software application or other similar digital image source generates or provides a digital image file that includes digital image data. Before the digital image file may be printed, however, it often is necessary or desirable to perform various digital image processing operations on the digital image data to improve the quality of the printed output. For example, if the digital print device optimally prints images having a specific image resolution, but the digital image file includes image data at a different resolution, it may be necessary to convert the image resolution of the digital image data prior to printing. In addition, if the digital print device uses four colorants (e.g., cyan, magenta, yellow and black ("CMYK"), but the digital image data includes six colorants (e.g., CMYK plus Pantone 117 and Pantone 143 spot colors), it may be necessary to convert the CMYK and spot colors to equivalent CMYK colors prior to printing. The specific set of image processing operations that are performed on a digital image file prior to printing by a digital print device is commonly referred to as a print workflow.

Numerous software applications exist for creating, managing and implementing print workflows. For example, EFI OneFlow Software, licensed by Electronics for Imaging, Inc., Foster City, Calif., U.S.A., includes an icon-based, graphical user interface for creating, managing and implementing print workflows. Once a workflow has been created, the workflow may be saved and later used to process a print job, or process additional print jobs using the same image processing steps.

Previously known workflow systems, however, have several shortcomings. For example, while processing a print job using a previously defined workflow, a user may determine that the workflow must be changed based on specific properties of the particular print job, or particular circumstances in the print shop. In such instances, previously known workflow systems, however, typically require that the user create an entirely new workflow that includes the desired changes. If such a system is used by a print shop that processes hundreds of thousands of print jobs, it may become extremely inefficient and time-consuming to have to create a new workflow for many of the print jobs. Also, such workflow systems may be highly error-prone, as each newly-created workflow may inadvertently exclude necessary processing steps, or may erroneously include unnecessary processing steps.

Other previously known workflow systems permit the user to modify a previously defined workflow without the need to create a new workflow, but may implement the changes in the original workflow itself. As a result, users of such systems must remember to undo any changes made to the workflow to restore the workflow to its original state. Such systems are rife with opportunities for errors, as some users may forget to undo changes, or may incorrectly undo a change, which may produce undesirable effects.

In addition, previously known workflow systems typically require wasteful reprocessing of entire print jobs whenever changes are made to a workflow. Indeed, after processing a print job using a previously defined workflow, a user may decide to include one or more additional process steps. For example, in a workflow that includes seven process steps, a user may decide to add a new process step (e.g., 6A) after the sixth process step in the original workflow. Previously known workflow systems typically require that the print job must be reprocessed by all processing steps in the workflow, even if the first six process steps are unaffected by the added step.

In addition, previously known workflow systems typically do not efficiently accommodate late stage submissions or revisions to a print job. For example, after processing a print job through a workflow, a user may realize that a page is missing from the print job, or may notice that a page in the print job includes a spelling error. In such instances, previously known workflow systems typically require that a new print job be created that includes the added or corrected page, and the entire new print job must be reprocessed through the workflow. This may be true even if only a single word on a single page must be revised, and even if the workflow requires a long processing time. As a result, previously known workflow systems do not efficiently accommodate revisions or additions to a print job.

In view of the foregoing, it would be desirable to provide methods and apparatus for modifying a predefined workflow without requiring the creation of a new workflow.

It further would be desirable to provide methods and apparatus for modifying a predefined workflow without requiring changes to the predefined workflow.

It also would be desirable to provide methods and apparatus for processing added or revised content to a print job through a workflow, without requiring that the entire revised print job be reprocessed through the workflow.

SUMMARY

In view of the foregoing, it is an object of this invention to provide methods and apparatus for modifying a predefined workflow without requiring the creation of a new workflow.

It further is an object of this invention to provide methods and apparatus for modifying a predefined workflow without requiring changes to the predefined workflow.

It also is an object of this invention to provide methods and apparatus for processing added or revised content to a print job through a workflow, without requiring that the entire revised print job be reprocessed through the workflow.

These and other objects of this invention are accomplished by providing methods and apparatus that may be used to process a print job through a copy of a workflow, modify the copied workflow and reprocess the print job only through the modified portion of the copied workflow. In addition, methods and apparatus in accordance with this invention may be used to modify or insert additional print files into a print job that has already been processed through a workflow, and process only the modified or inserted print files through the workflow.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 3 is an exemplary processing instruction file in accordance with this invention;

FIGS. 4A-D are alternative exemplary processing instruction files in accordance with this invention;

FIG. 6 is another exemplary processing instruction file in accordance with this invention;

FIG. 8 is yet another exemplary processing instruction file in accordance with this invention.

DETAILED DESCRIPTION

Methods and apparatus in accordance with this invention may be used to process a print job through a copy of a workflow, modify the copied workflow and reprocess the print job only through the modified portion of the copied workflow. In addition, methods and apparatus in accordance with this invention may be used to modify or insert additional print files into a print job that has already been processed through a workflow, and process only the modified or inserted print files through the workflow.

Figure 1:
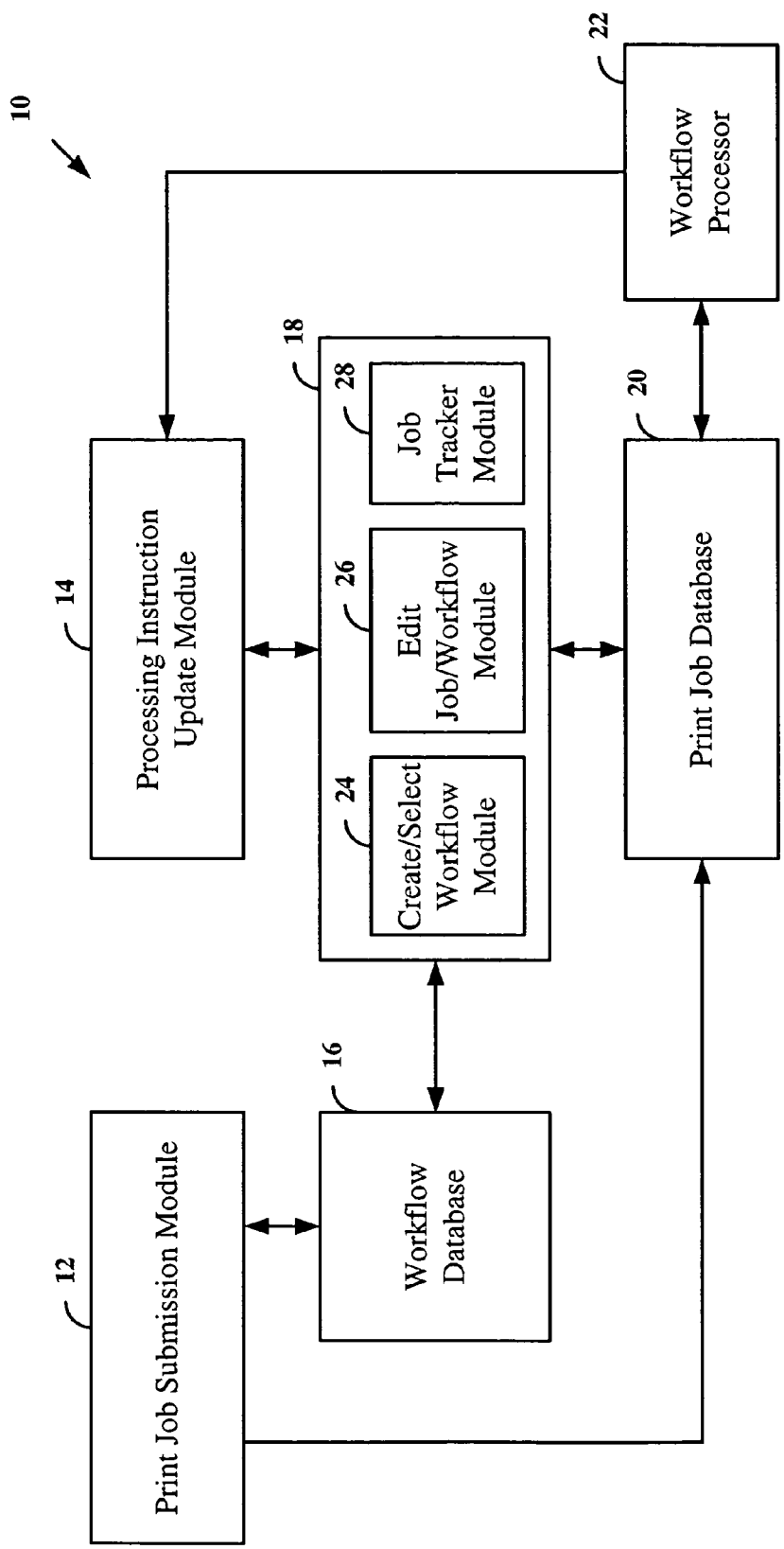
FIG. 1 is a block diagram of an exemplary workflow processing system in accordance with this invention

Referring to FIG. 1, an exemplary embodiment of a workflow processing system in accordance with this invention is described. Exemplary workflow processing system 10 includes print job submission module 12, processing instruction update module 14, workflow database 16, user module 18, print job database 20 and workflow processor 20. As used herein, the term "module" refers to any software and/or hardware processing component or portion thereof that may be used to implement one or more workflow processing functions. User module 18 includes create/select workflow module 24, edit job/workflow module 26 and job tracker module 28.

Figure 2:
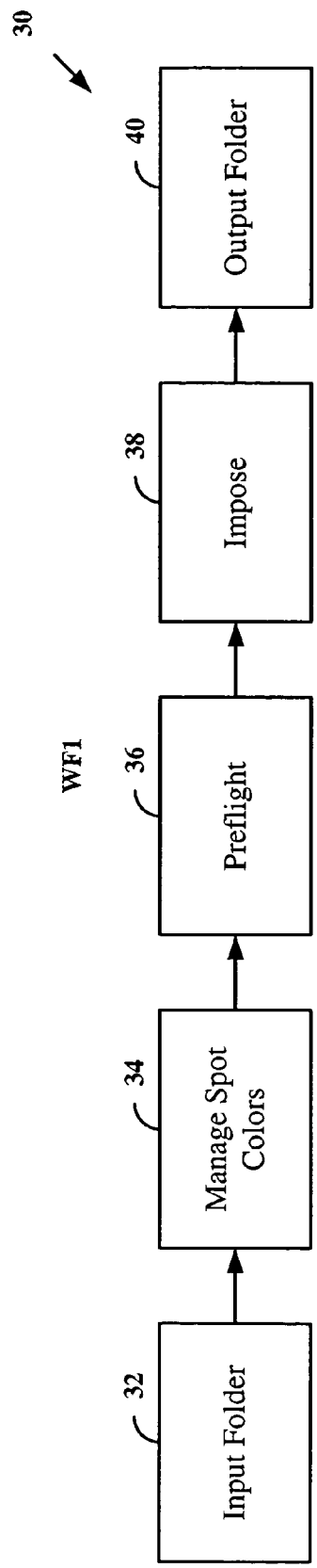
FIG. 2 is a block diagram of an exemplary workflow for use with methods and apparatus in accordance with this invention.

FIG. 2 illustrates an exemplary workflow for use with methods and apparatus in accordance with this invention. Exemplary workflow 30 includes five processing stages: input folder 32, spot color manager 34, preflight 36, imposition 38 and output folder 40. Persons of ordinary skill in the art will understand that workflow 30 may include more than or less than five processing stages. Workflow 30 may be a created or selected using create/select workflow module 24. In particular, create/select workflow module 24 may include an icon-based graphical user interface, such as a keyboard, monitor and mouse (not shown), for graphically creating a print workflow that may be saved in a workflow database, such as workflow database 16. Additionally, create/select workflow module 24 may include a workflow select tool (not shown) for selecting a preexisting workflow from workflow database 16. Workflow 30 may be assigned a name for easy identification, such as "WF1."

Referring again to FIG. 1, print job submission module 12 may be used to create a print job for processing by workflow processing system 10. To create a print job, print job submission module 12 assigns an ID that may be used to uniquely identify the print job in workflow processing system 10. For example, the unique ID may be an alphanumeric code, such as "Job 1," or other similar code. Next, print job submission module 12 may be used to identify a workflow from workflow database 16 that will be used to process the print job. Print job submission module 12 may include a user interface, hot folder, or other similar technique for identifying a workflow from workflow database 16. For example, print job submission module 12 may identify workflow WF1 for the print job. After a workflow has been identified, print job submission module 12 makes a copy of the identified workflow (e.g., "WF1$_C$") for use during processing of the print job. A copy of the identified workflow is used so that any changes made to the workflow during processing only affect the copy, and do not alter the original workflow.

Next, print job submission module 12 may be used to select one or more input files for the print job. An input file may be a PDF file, PostScript file, encapsulated PostScript ("EPS") file, Desktop Colour Separation version 2.0 ("DCS2") file, tagged image file format ("TIFF") file, JPEG file, word processing file, spreadsheet file or other similar file that describes a document to be printed. Each input file may be selected using a user interface, or other similar technique for selecting an input file. For example, print job submission module 12 may select an input file "Brochure 1.pdf" for the print job. Thus, at this point, the print job includes a unique ID (e.g., Job 1), associated to a copied workflow (e.g., WF1$_C$) and one or more associated input files (e.g., Brochure 1.pdf). Persons of ordinary skill in the art will understand that the order of assigning a unique ID, identifying a workflow from workflow database 16, copying an identified workflow and selecting one or more input files may be interchanged.

Referring again to FIG. 1, print job submission module 12 next provides the copied workflow and selected print files in the print job to processing instruction update module 14, which creates a processing instruction file for the print job. Referring now to FIG. 3, an exemplary processing instruction file for use with methods and apparatus in accordance with this invention is described. Processing instruction file 50 may include one or more processing instruction sets 60, with each processing instruction set including N processing nodes 52 (Processing Node 1, Processing Node 2, . . . , Processing Node N). Each processing node has a corresponding processing stage in the copied workflow. Each processing node 52 includes an input field 54, an output field 56 and a status field 58. Input field 54 and output field 56 may be used to identify an input file and an output file, respectively, for the corresponding processing stage. Status field 58 may be used to specify a status of the corresponding processing stage. For example, the status field may specify "Not Completed," "Completed," "Processing," "Failed," or other similar status.

Figure 4A:
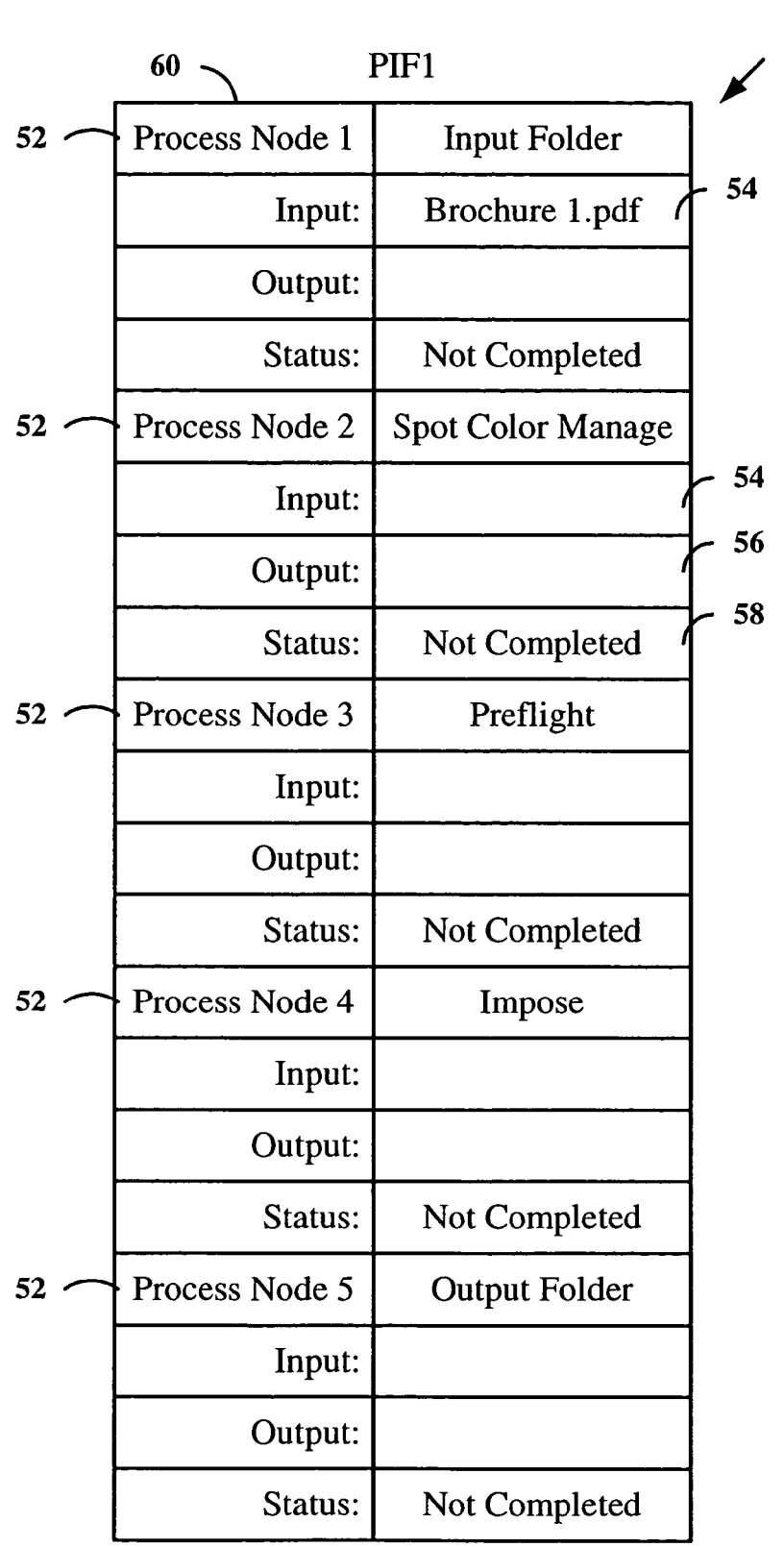

Referring now to FIG. 4A, an exemplary processing instruction file 50 is described based on exemplary print job Job 1. Processing instruction file 50 includes a single processing instruction set 60 that includes five processing nodes 52: Processing Node 1-Processing Node 5. When processing instruction update module 14 creates processing instruction file 50, input field 54 of Processing Node 1 may be set to the selected input file (e.g., Brochure 1.pdf), all other input fields 54 and output fields 56 may be blank, and all status fields 58 may be set to "Not Completed" to indicate that the print job has not yet been processed by workflow system 10. Processing instruction file 50 may be assigned a name for easy identification, such as "PIF1." Processing instruction update module 14 then provides processing instruction file 50 to print job submission module 12.

Figure 5:
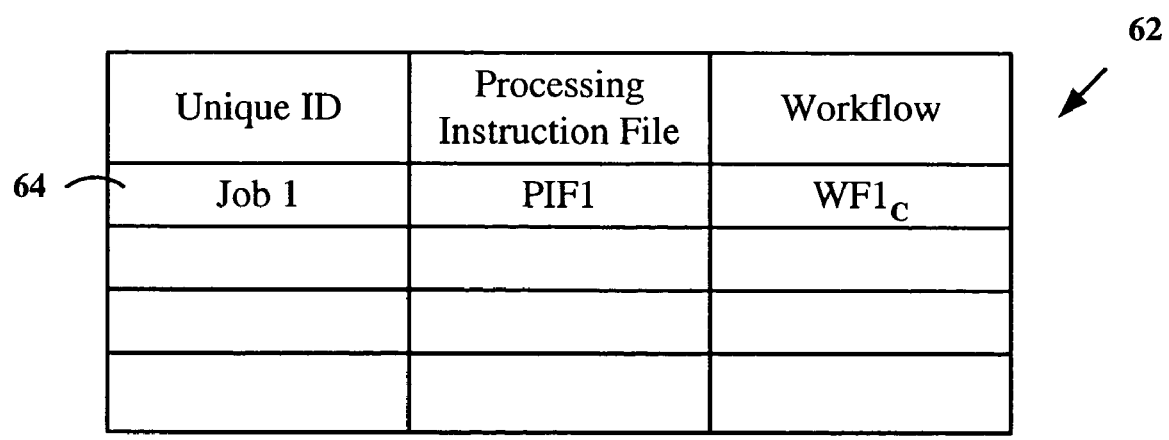
FIG. 5 is an exemplary print job database file in accordance with this invention.

After receiving processing instruction file 50, print job submission module 12 provides the unique ID, copied workflow and processing instruction file 50 to print job database 20. FIG. 5 illustrates an exemplary data file 62 in print job database 20. Data file 62 includes one or more entries 64, with each entry including the unique ID, print instruction file and copied workflow associated with a particular print job. For example, entry 64 indicates that the print job having unique ID "Job 1" is associated with processing instruction file PF1 and copied workflow WF1$_C$. Persons of ordinary skill in the art will understand that each entry 64 may include additional information associated with a print job Referring again to FIG. 1, print job database 20 next sends a trigger execution instruction, which includes the unique ID of the print job, to workflow processor 22. On or after receipt of the trigger execution instruction, workflow processor 22 retrieves processing instruction file 50 and the copied workflow from print job database 20 based on the unique ID associated with the print job, and then commences processing the print job. In particular, workflow processor 22 executes the processing instruction set 60, instantiating each processing stage in the selected workflow in series. While executing the instruction set, workflow processor 22 sends subsequent status updates to job tracker module 26.

For example, referring again to FIGS. 2, 4 and 5, on or after receipt of the trigger execution instruction, which includes unique ID Job 1, workflow processor 22 retrieves processing instruction file PIF1 and copied workflow WF1$_C$, and then instantiates input folder 32 using input file "Brochure 1.pdf." As each stage operates, workflow processor 22 provides print job database 20 with updated status and output file information for processing instruction file PIF1. Thus, after Processing Node 1 commences, workflow processor 22 may provide a status of "Processing" to print job database 20, which may then change the status of Processing Node 1 in processing instruction file PIF1 from "Not Completed" to "Processing," as illustrated in FIG. 4B. If Processing Node 1 successfully completes, workflow processor 22 may provide a status of "Completed," and may provide an output file name (e.g., "Brochure 1O1.pdf") to print job database 20. Print job database 20 may then change the status of Processing Node 1 in processing instruction file PIF1 from "Processing" to "Completed," and may add "Brochure 1O1.pdf" as the output file name for Processing Node 1 and the input file name for Processing Node 2, as illustrated in FIG. 4C. Workflow processor 22 may then instantiate spot color manager 34. If, however, Processing Node 1 does not successfully complete processing, workflow processor 22 may provide a status of "Failed" to print job database 20, which may then change the status of Processing Node 1 in processing instruction file PIF1 from "Processing" to "Failed," as illustrated in FIG. 4D, and may terminate processing of the print job.

Referring again to FIG. 1, on or after receipt of the status updates from print job database 20, job tracker module 26 commences tracking the status of the print job processing. In particular, job tracker module 26 periodically receives information regarding the status field of each process node in process instruction file 50 for the print job. Job tracker module 26 may include a user interface (e.g., a graphical, audible or other similar user interface) for communicating information about the status of the print job processing. Thus, a user may receive continuous feedback about the status of the print job during workflow processing.

Workflow processor 22 continues successively instantiating each stage in the processing instruction set until all processing stages successfully complete, or until one stage fails. Upon either occurrence, a user may modify the print job or the workflow using edit job/workflow module 24. For example, if the workflow processing terminates as a result of a failure of one processing stage, a user may decide to modify the print job or the workflow to correct a problem in the print job. Alternatively, if all processing stages in the processing instruction set terminate successfully, a user may nevertheless decide to modify the print job or the workflow to alter the processing of the print job.

For example, a user may modify copied workflow WF1$_C$ to add, delete, rearrange or change the parameters of one or more processing stages in the workflow. After the user completes modifying the workflow, processing instruction update module 14 may then modify processing instruction file 50 for the print job. In particular, based on the changes made to the copied workflow, processing instruction update module 14 modifies processing instruction file 50 to create a modified processing instruction file 50' based on the last state of processing instruction file 50.

Figure 7:
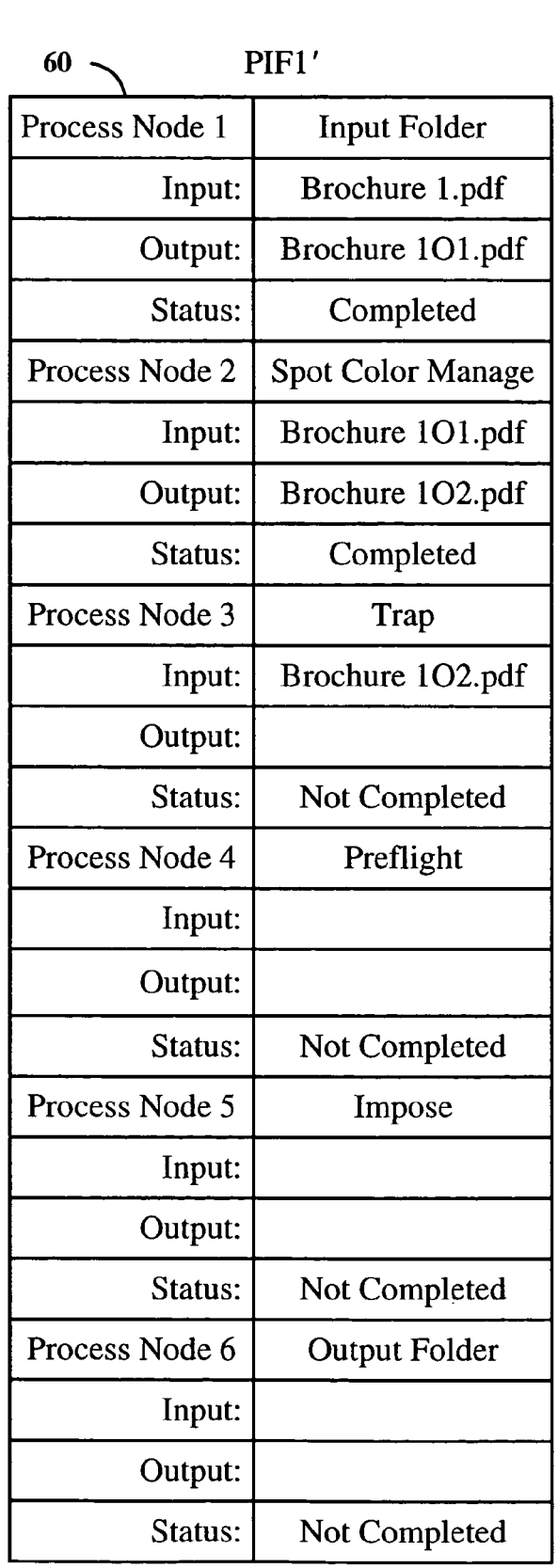
FIG. 7 is still another exemplary processing instruction file in accordance with this invention.

FIG. 6 illustrates exemplary processing instruction file PIF1 after successful completion of all five processing stages. If a user now adds a processing stage between the second and third stages, processing instruction update module 14 may create modified processing instruction file PIF1', illustrated in FIG. 7, that: (a) includes the input and output file names and status for Processing Nodes 1 through 2 from processing instruction file PIF1; (b) includes the new Processing Node 3 (e.g., "Trap") after Processing Node 2; (c) includes the output file of Processing Node 2 as the input file of new Processing Node 3; (d) deletes the input and output file names for Processing Nodes 4-6 (formerly Processing Nodes 3-5 in PIF1); and (e) changes the status of Processing Nodes 4-6 to "Not Completed."

Processing instruction update module 14 then provides the modified processing instruction file 50' to print job submission module 12, which provides the unique ID, modified copied workflow and modified processing instruction file 50' to print job database 20 for processing as described above. In the example described above for processing instruction file PIF1', processing will begin at Process Node 3 (Trap), with input file Brochure 1O2.pdf. Thus, the print job must not be reprocessed through the entire workflow. Instead, the print job is processed beginning at the portion of the workflow that has changed.

Alternatively, a user may modify a print job (e.g., Job 1) to add a new input file to the print job. For example, a user may add a new input file may correct a spelling error on a single page of the original input file. After the user completes adding the new input file, processing instruction update module 14 may then modify processing instruction file 50 for the print job. In particular, based on the added input files, processing instruction update module 14 modifies processing instruction file 50 to create modified processing instruction file 50" based on the last state of processing instruction file 50.

For example, if a user now adds a new input file (e.g., "Brochure 2.pdf") to print job Job 1, processing instruction update module 14 may create modified processing instruction file PIF1", illustrated in FIG. 8, which includes first processing set 60a and second processing set 60b. First processing set 60a is identical to processing set 60 in FIG. 6, indicating that Brochure 1.pdf successfully completed all five processing stages. Second processing set 60b is identical to first processing set 60a, except the input file to Process Node 1 has been changed to Brochure 2.pdf, the output file of Process Node 1 and the input and output files of Process Nodes 2-5 have been deleted, and the status of Process Nodes 1-5 have been changed to "Not Completed." Processing instruction update module 14 then provides modified processing instruction file PIF1" to print job submission module 12, which provides the unique ID, modified workflow and modified processing instruction file to print job database 20 for processing as described above. In this instance, however, only Brochure 2.pdf is processed. Thus, only the new print file is processed through the workflow.

Persons of ordinary skill in the art will understand that methods and apparatus in accordance with this invention may be combined. For example, after processing print job Job 1 using the originally copied WF1$_C$, a user may decide to modify the workflow and also add new input files to the print job. For example, if a user adds a trapping stage between the second and third stages in WF1$_C$, and adds new input file Brochure 2.pdf to the print job, processing instruction update module 14 may create modified processing instruction file PIF1''' that includes first processing set 60$a$ and second processing set 60$b$. First processing set 60$a$ includes the input and output file names and status for Processing Nodes 1 through 2 from PIF1; (b) includes the new Processing Node 3 ("Trap") after Processing Node 2; (c) includes the output file of Processing Node 2 as the input file of new Processing Node 3; (d) deletes the input and output file names for Processing Nodes 4-6 (formerly Processing Nodes 3-5); and (e) changes the status of Processing Nodes 4-6 to "Not Completed." Second processing set 60$b$ is identical to first processing set 60$a$, except the input file to Process Node 1 is Brochure 2.pdf, the output file of Process Node 1 and the input and output files of Process Nodes 2-6 are blank, and the status of Process Nodes 1-6 are set to "Not Completed."

Persons of ordinary skill in the art also will understand that apparatus in accordance with this invention also may include a general purpose computing device, such as a personal computer, and a special purpose computing device, such as a controller for digital printers and digital copiers. Such computing devices may include a computer memory such as read only memory, hard disk, magnetic disk, optical disk, or other suitable memory that may be used to store software modules and other data, used to implement methods of the present invention.

The foregoing merely illustrates the principles of this invention, and various modifications can be made by persons of ordinary skill in the art without departing from the scope and spirit of this invention.

The invention claimed is:

1. A method for processing a print job, the method comprising:
   providing a workflow database containing pre-existing workflows for performing a print job;
   providing workflow creation tools for allowing a user to create a workflow for a print job, wherein said workflow comprises a plurality of discrete processing stages including at least two operations selected from among a list of operations consisting of a folder input stage, a spot color management stage, a preflight stage, an imposition stage, and a folder output stage;
   selecting a workflow from among created workflows and preexisting workflows, forming a selected workflow comprising a plurality of modules, wherein each module in the plurality of modules accomplishes at least one print job processing step;
   submitting a print job to a selected workflow;
   initiating print job processing based on the selected workflow, wherein at least one module is completed and at least one of the modules fails, creating at least one completed module and at least one failed module;
   alerting a user when the at least one of the modules fails;
   modifying at least one of the modules after at least one module fails, creating at least one modified module;
   modifying the selected workflow, forming a modified workflow, wherein the modified workflow includes the at least one modified module, but does not include the completed modules;
   reprocessing the print job based on the modified workflow;
   assigning the modified workflow a name;
   saving the modified workflow in the workflow database for subsequent use; and
   processing at least one additional print job using the saved modified workflow.

2. The method of claim 1, wherein modifying comprises changing a parameter of one of the modules.

3. The method of claim 1, wherein modifying comprises:
   adding a module to the workflow wherein the added module comprises the modified module.

4. The method of claim 3, wherein:
   the workflow comprises first and second modules; and
   adding comprises adding a module between the first and second modules.

5. The method of claim 3, wherein:
   the workflow comprises first and second modules; and
   adding comprises adding a module after the second module.

6. The method of claim 1, wherein the print job comprises a first input file,
   wherein the step of modifying includes associating a second input file to the print job.

7. The method of claim 6, wherein the input file comprises a PDF file, PostScript file, encapsulated PostScript ("EPS") file, Desktop Colour Separation version 2.0 ("DCS2") file, tagged image file format ("TIFF") file, JPEG file, word processing file, or spreadsheet file.

* * * * *

UNITED STATES PATENT AND TRADEMARK OFFICE
CERTIFICATE OF CORRECTION

| | | |
|---|---|---|
| PATENT NO. | : 7,688,458 B2 | Page 1 of 1 |
| APPLICATION NO. | : 10/840569 | |
| DATED | : March 30, 2010 | |
| INVENTOR(S) | : Puneet Goel et al. | |

It is certified that error appears in the above-identified patent and that said Letters Patent is hereby corrected as shown below:

In column 3, line 4, after "invention" insert -- ; --.

In column 5, line 5, delete "PF1" and insert -- PIF1 --, therefor.

In column 5, line 8, after "job" insert -- . --.

Signed and Sealed this

Twelfth Day of October, 2010

David J. Kappos
*Director of the United States Patent and Trademark Office*